(12) United States Patent
She et al.

(10) Patent No.: US 10,894,240 B2
(45) Date of Patent: Jan. 19, 2021

(54) POWDER PROCESSING APPARATUS FOR CLASSIFYING AND DEGASSING

(71) Applicant: United Technologies Corporation, Farmington, CT (US)

(72) Inventors: Ying She, East Hartford, CT (US); Zissis A. Dardas, Worcester, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/416,876

(22) Filed: May 20, 2019

(65) Prior Publication Data

US 2019/0270120 A1   Sep. 5, 2019

Related U.S. Application Data

(62) Division of application No. 14/615,733, filed on Feb. 6, 2015, now Pat. No. 10,293,378.

(51) Int. Cl.
| | | |
|---|---|---|
| *B07B 4/02* | (2006.01) | |
| *B01J 8/18* | (2006.01) | |
| *B01J 19/00* | (2006.01) | |
| *B07B 4/08* | (2006.01) | |
| *B07B 9/02* | (2006.01) | |

(Continued)

(52) U.S. Cl.
CPC ............ *B01J 8/1854* (2013.01); *B01J 8/26* (2013.01); *B01J 19/006* (2013.01); *B07B 4/00* (2013.01); *B07B 4/08* (2013.01); *B07B 9/02* (2013.01); *B22F 1/0014* (2013.01); *B29C 64/314* (2017.08); *B33Y 40/00* (2014.12);

(Continued)

(58) Field of Classification Search
CPC ..... B07B 4/00; B07B 4/08; B07B 9/02; B01J 2/16; B01J 8/24; B01J 8/26; B01J 8/1845; B01J 8/1854; B01J 8/1872; B01J 8/32; B01J 2208/00672; B01J 2208/0084; B01J 2208/00938; B01J 19/006; B22F 1/0014; B22F 3/1055; B33Y 40/00; B29C 64/314

See application file for complete search history.

(56) References Cited

U.S. PATENT DOCUMENTS

| | | | |
|---|---|---|---|
| 2,502,953 A | 4/1950 | Jahnig | |
| 2,586,818 A | 2/1952 | Viggo | |

(Continued)

FOREIGN PATENT DOCUMENTS

| | | |
|---|---|---|
| EP | 0801988 | 10/1997 |
| JP | 06343927 | 12/1994 |
| WO | 2007124745 | 11/2007 |

OTHER PUBLICATIONS

European Partial Search Report for European Patent Application No. 16154727 completed Jun. 17, 2016.

(Continued)

*Primary Examiner* — Joseph C Rodriguez
(74) *Attorney, Agent, or Firm* — Carlson, Gaskey & Olds, P.C.

(57) ABSTRACT

A method of treating a powder material includes classifying a powder material within a vessel by using a fluidized bed of the powder material to separate smaller particles of the powder material from larger particles of the powder material, and degassing the separated smaller particles and the larger particles within the vessel by heating and fluidizing the larger particles and the separated smaller particles.

9 Claims, 2 Drawing Sheets

(51) Int. Cl.
  *B33Y 40/00* (2020.01)
  *B22F 1/00* (2006.01)
  *B29C 64/314* (2017.01)
  *B01J 8/26* (2006.01)
  *B07B 4/00* (2006.01)
  *B22F 3/105* (2006.01)
  *B01J 2/26* (2006.01)
  *B03B 4/00* (2006.01)

(52) U.S. Cl.
  CPC . *B01J 2/26* (2013.01); *B03B 4/00* (2013.01); *B22F 3/1055* (2013.01); *Y02P 10/25* (2015.11)

(56) References Cited

U.S. PATENT DOCUMENTS

| | | | |
|---|---|---|---|
| 2,876,557 A | 3/1959 | Francis | |
| 3,666,253 A | 5/1972 | Yoshio et al. | |
| 3,691,644 A | 9/1972 | Schnitzer | |
| 4,219,589 A | 8/1980 | Goethals | |
| 4,589,981 A | 5/1986 | Barari | |
| 4,664,889 A | 5/1987 | Steenge | |
| 4,865,722 A | 8/1989 | Ririe et al. | |
| 5,184,671 A | 2/1993 | Alliston | |
| 5,198,029 A | 3/1993 | Dutta | |
| 5,374,413 A | 12/1994 | Kim | |
| 5,927,510 A | 7/1999 | Leute et al. | |
| 5,975,309 A * | 11/1999 | Mitsuda | B03B 4/00 209/138 |
| 6,253,465 B1 | 7/2001 | Ichitani et al. | |
| 6,711,831 B1 | 3/2004 | Hansen | |
| 6,851,558 B2 | 2/2005 | Ingels | |
| 7,032,849 B2 | 4/2006 | Takahashi et al. | |
| 7,217,747 B2 * | 5/2007 | Weier | C08F 265/04 523/201 |
| 7,908,765 B2 | 4/2011 | Waldron et al. | |
| 8,540,174 B2 | 9/2013 | Makino | |
| 9,199,265 B2 | 12/2015 | Ledoux | |
| 9,370,756 B2 | 6/2016 | Nielsen | |
| 9,421,612 B2 * | 8/2016 | Fang | B22F 3/24 |
| 9,580,551 B2 * | 2/2017 | Vanelli | C08G 69/265 |
| 9,732,422 B2 * | 8/2017 | She | C22C 21/00 |
| 9,839,891 B2 * | 12/2017 | Ingels | B01J 8/24 |
| 9,993,872 B2 * | 6/2018 | Nardi | C21D 9/0068 |
| 10,293,378 B2 * | 5/2019 | She | B01J 8/26 |
| 2006/0071359 A1 * | 4/2006 | Monsheimer | C08J 3/14 264/113 |
| 2016/0074942 A1 * | 3/2016 | Fang | B22F 1/0048 419/32 |
| 2019/0039073 A1 * | 2/2019 | She | B07B 4/00 |

OTHER PUBLICATIONS

Partial European Search Report for European Patent Application No. 20154191.9 completed Jun. 18, 2020.

European Search Report for European Patent Application No. 20154191.9 completed Jun. 18, 2020, dated Oct. 1, 2020.

* cited by examiner

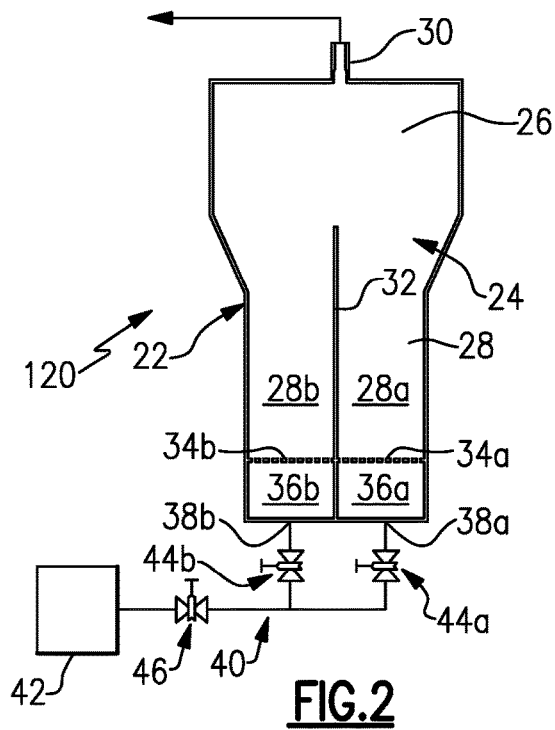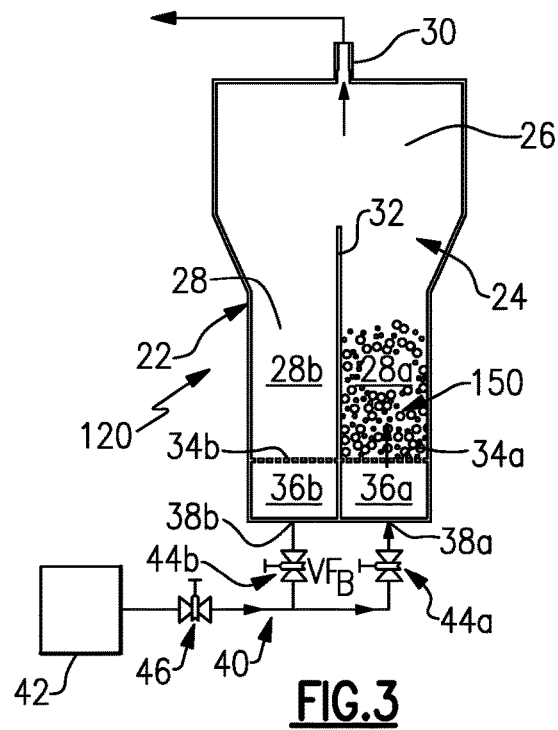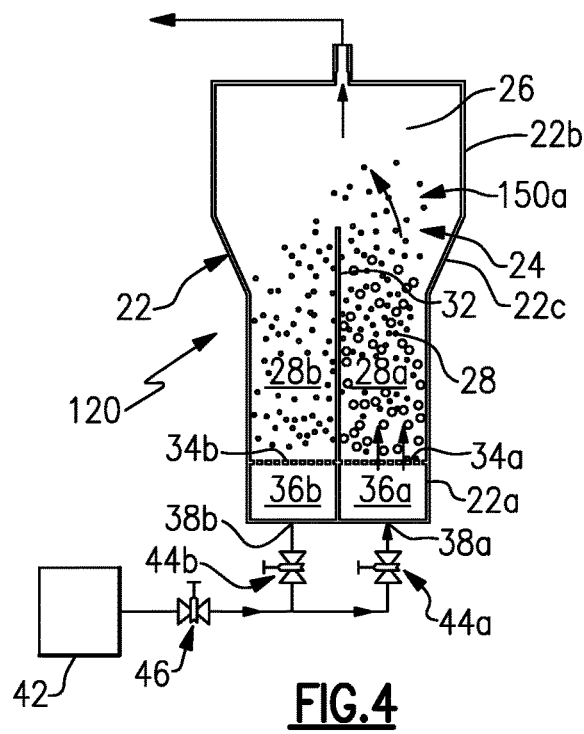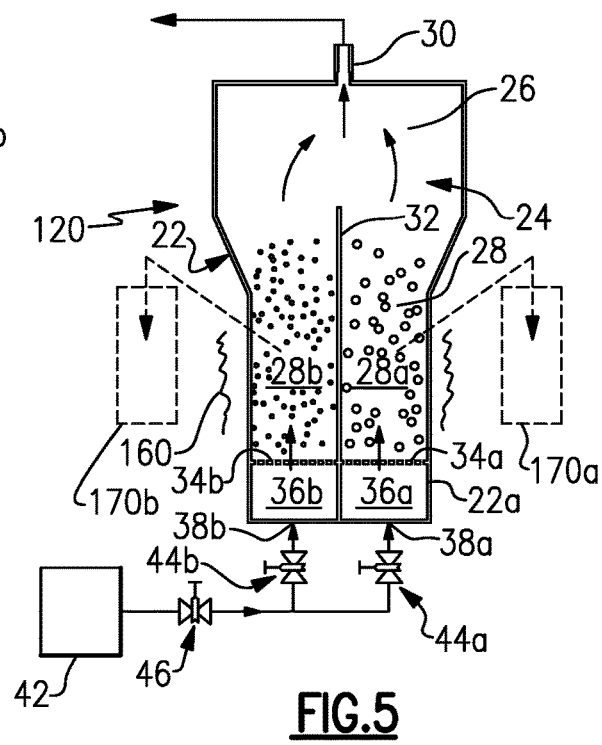

POWDER PROCESSING APPARATUS FOR CLASSIFYING AND DEGASSING

CROSS-REFERENCE TO RELATED APPLICATION

This application is a divisional of U.S. patent application Ser. No. 14/615,733 filed Feb. 6, 2015.

BACKGROUND

Powder materials can be used to fabricate end-use articles. For example, additive fabrication techniques can be used to consolidate metallic powder. Such techniques can benefit from using powder with a controlled size distribution. The powder can be classified using a sieve to produce a desired size distribution.

Additionally, powders can adsorb moisture or other foreign contaminants, which can lead to voids or other defects in the end article. The moisture can also evolve hydrogen, which can contribute to embrittlement of the article. Either before or after classifying the powder, the powder can be degassed to remove adsorbed contaminants. The degassing can involve loading the powder into a vessel and cycling the interior of the vessel between high and low pressure while at elevated temperature.

SUMMARY

A powder processing apparatus according to an example of the present disclosure includes a vessel that has an interior chamber with top and bottom regions, and a gas outlet to the exterior of the vessel. A wall divides the bottom region into first and second sub-regions, with the top region extending above the wall, and first and second porous plates dividing the first and second sub-regions such that there are first and second manifold regions below the first and second porous plates. The first and second gas manifold regions include first and second gas inlets from the exterior of the vessel.

In a further embodiment of any of the foregoing embodiments, the interior chamber diverges from the bottom region to the top region.

In a further embodiment of any of the foregoing embodiments, the top region has a larger diameter than the bottom region.

In a further embodiment of any of the foregoing embodiments, the vessel includes a bottom cylindrical section that has a first diameter, a top cylindrical section that has a second diameter that is greater than the first diameter, and a frustoconical intermediate section joining the bottom cylindrical section and the top cylindrical section.

A further embodiment of any of the foregoing embodiments includes at least one pressurized gas source and a flow network connecting the at least one pressurized gas source with the first and second gas inlets.

In a further embodiment of any of the foregoing embodiments, the flow network includes a first metering valve operable to control flow into the first gas inlet, and a second metering valve operable to control flow into the second gas inlet.

In a further embodiment of any of the foregoing embodiments, the first and second sub-regions are equal in size.

A method of treating a powder material according to an example of the present disclosure includes classifying a powder material within a vessel by using a fluidized bed of the powder material to separate smaller particles of the powder material from larger particles of the powder material, and degassing the separated smaller particles and the larger particles within the vessel by heating and fluidizing the larger particles and the separated smaller particles.

In a further embodiment of any of the foregoing embodiments, the classifying of the powder material includes increasing a gas flow to the fluidized bed of the powder material such that the gas flow entrains the smaller particles and carries the smaller particles upwards out of the fluidized bed of the powder material.

A further embodiment of any of the foregoing embodiments includes carrying the smaller particles upwards into a diffusion zone that slows the velocity of the smaller particles such that the smaller particles dis-entrain and fall into a collection area separate from the fluidized bed having the larger particles.

In a further embodiment of any of the foregoing embodiments, the vessel includes an interior chamber having top and bottom regions, and a gas outlet to the exterior of the vessel. A wall divides the bottom region into first and second sub-regions, with the top region extending above the wall. First and second porous plates divide the first and second sub-regions such that there are first and second manifold regions below the first and second porous plates. The first and second gas manifold regions included first and second gas inlets from the exterior of the vessel.

In a further embodiment of any of the foregoing embodiments, the classifying of the powder material includes increasing a gas flow through the first porous plate to the fluidized bed of the powder material in the first sub-region such that the gas flow entrains the smaller particles and carries the smaller particles upwards from the first sub-region into the top region.

A further embodiment of any of the foregoing embodiments includes slowing the velocity of the smaller particles in the top region such that the smaller particles dis-entrain and fall into the second sub-region.

A further embodiment of any of the foregoing embodiments includes heating and fluidizing the smaller particles in the second sub-region, and heating and fluidizing the larger particles in the first sub-region.

A further embodiment of any of the foregoing embodiments includes heating the powder material within the vessel during said step (a).

A further embodiment of any of the foregoing embodiments includes repeating said step (a) using either the smaller particles or the larger particles as the powder material that is classified.

A method of treating a powder material according to an example of the present disclosure includes (a) first and second powder consolidation processes that utilize, respectively, first and second feed powders that have different powder size distributions; (b) classifying a starting powder material within a vessel with respect to the different powder size distributions by using a fluidized bed of the powder material to separate smaller particles of the powder material from larger particles of the powder material; (c) degassing the separated smaller particles and the larger particles within the vessel by using a first heated fluidized bed of the separated smaller particles and a second heated fluidized bed of the larger particles; and (d) using the degassed smaller particles from said step (c) as the first feed powder in said step (a) to form a first consolidated article and using the degassed larger particles from said step (c) as the second feed powder in said step (a) to form a second consolidated article.

In a further embodiment of any of the foregoing embodiments, the first and second powder consolidation processes are additive fabrication processes.

In a further embodiment of any of the foregoing embodiments, the classifying of the powder material includes increasing a gas flow to the fluidized bed of the powder material such that the smaller particles entrain in the gas flow and are carried upwards out of the fluidized bed of the powder material, and carrying the smaller particles upwards into a diffusion zone that slows the velocity of the smaller particles such that the smaller particles dis-entrain and fall into a collection area separate from the fluidized bed having the larger particles.

In a further embodiment of any of the foregoing embodiments, the vessel includes an interior chamber having top and bottom regions, and a gas outlet to the exterior of the vessel. A wall divides the bottom region into first and second sub-regions, with the top region extending above the wall. First and second porous plates divide the first and second sub-regions such that there are first and second manifold regions below the first and second porous plates. The first and second gas manifold regions include first and second gas inlets from the exterior of the vessel.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 illustrates another example powder processing apparatus that additionally includes at least one pressurized gas source and a flow network for distributing the gas to a vessel.

FIG. 3 illustrates a powder processing apparatus during one stage of operation in which an initial powder material has been loaded into one sub-region of an interior chamber.

FIG. 4 illustrates the powder processing apparatus of FIG. 3 during a later stage of operation in which smaller particles are entrained in the gas flow and are carried upwards in the vessel.

FIG. 5 illustrates the powder processing apparatus of FIG. 4 at a later stage of operation after which the smaller particles have been collected into a separate sub-region in the interior chamber and are then subjected to a degassing step.

DETAILED DESCRIPTION

Figure 1:
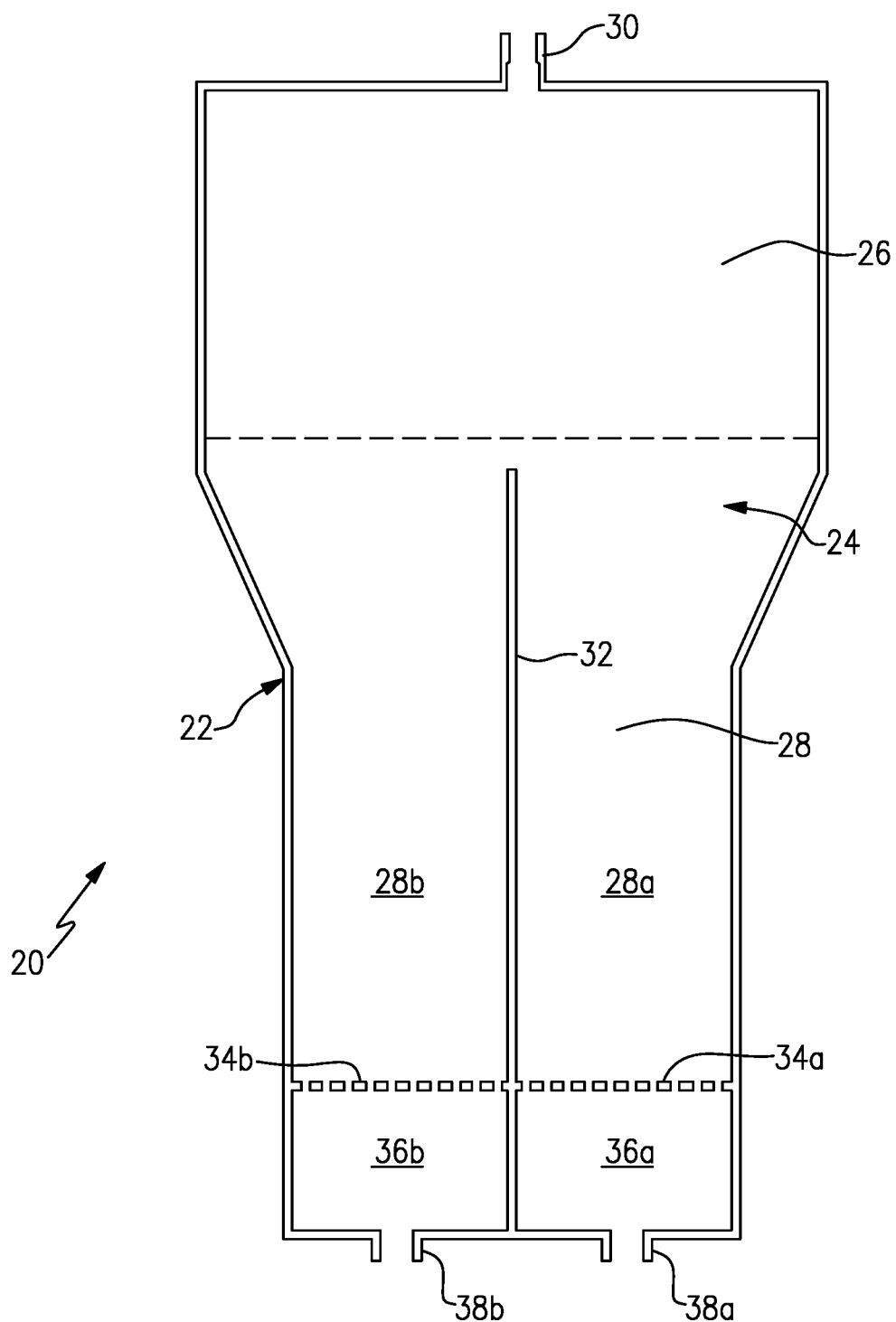
FIG. 1 illustrates an example powder processing apparatus for classifying and degassing a powder material.

FIG. 1 illustrates an example powder processing apparatus 20 (hereafter "apparatus 20". Powder materials, such as metallic powders, can be consolidated to form a solid article. For example, powder materials are used in additive fabrication techniques. Such techniques can utilize powder materials that have been degassed to remove adsorbed contaminants and classified to provide a controlled particle size distribution. In this regard, as will be described in further detail below, the apparatus 20 enables contiguous classification and degassing of a powder material in a single vessel.

In the illustrated example, the apparatus 20 includes a vessel 22 that has an interior chamber 24 with a top region 26 and a bottom region 28 (designated by the dashed line in FIG. 1). In this example, the top region 26 includes a gas outlet 30 that is used to vent process gas from the interior chamber 24 to the exterior of the vessel 22. The location of the gas outlet 30 is at the top of the top region 26. Alternatively, the location of the gas outlet 30 could be at the sides of the top region 26, although such locations might alter the flow through the apparatus 20 and thus also alter the performance.

A wall 32 divides the bottom region 28 into a first sub-region 28a and a second sub-region 28b. In one example, the wall 32 equally divides the bottom region 28 such that the sub-regions 28a/28b are of equal size (volume). If the bottom region 28 is cylindrical, the sub-regions 28a/28b will be semi-circle half-cylinders.

The top region 26 extends above the wall 32. A first porous plate 34a divides the first sub-region 28a, and a second porous plate 34b divides the second sub-region 28b. The porous plates 34a/34b divide the respective sub-regions 28a/28b such that there is a first gas manifold region 36a below the first porous plate 34a and a second gas manifold region 36b below the second porous plate 34b. The first gas manifold region 36a includes a first gas inlet 38a and the second gas manifold region 36b includes a second gas inlet 38b. The gas inlets 38a/38b permit process gas flow into the interior chamber 24 from the exterior of the vessel 22.

FIG. 2 illustrates a further example of a powder processing apparatus 120. In this disclosure, like reference numerals designate like elements where appropriate and reference numerals with the addition of one-hundred or multiples thereof designate modified elements that are understood to incorporate the same features and benefits of the corresponding elements. In this example, the apparatus 120 additionally includes a flow network 40 and at least one pressurized process gas source 42. Process gas can include, but is not limited to, nitrogen, argon, helium, and mixtures thereof. The flow network 40 connects the one or more gas sources 42 with the first and second gas inlets 38a/38b. The flow network 40 includes a first metering valve 44a that is operable to control flow of process gas into the first gas inlet 38a, and a second metering valve 44b that is operable to control flow of process gas into the second gas inlet 38b. An additional metering valve 46 can be provided upstream of the metering valves 44a/44b in the flow network 40, for controlling flow from the one or more gas sources 42.

FIGS. 3, 4, and 5 illustrate additional features of the apparatus 120, as well as the operation thereof. As shown in FIG. 3, a starting powder material 150 is initially loaded into the first sub-region 28a, and the metering valves 44a and 46 are open to provide a flow of process gas into the first gas manifold region 36a through the gas inlet 38a. The first gas manifold region 36a distributes the process gas to the porous plate 34a. The process gas permeates through the pores of the porous plate 34a and exits above into the powder material 150. As the flow of process gas increases, the powder material 150 fluidizes into a fluidized bed in the first sub-region 28a. The pores of the porous plates 34a/34b are smaller than the size of the particles in the powder material 150 such that the powder cannot fall through the plates 34a/34b.

As shown in FIG. 4, as the flow of the process gas increases, the flow entrains the smaller, lighter particles in the powder material 150. The process gas thus carries the smaller particles upwards through the first sub-region 28a into the top region 26. In this example, the interior chamber 24 diverges from the bottom region 28 to the top region 26. For example, the top region 26 can have a larger (inner) diameter than the bottom region 28. In a further example, the geometry of the interior chamber 24 can also be reflected in the geometry of the vessel 22 such that the vessel 22 includes a bottom cylindrical section 22a that has a first diameter, a top cylindrical section 22b that has a second diameter that is greater than the first diameter, and a frustoconical intermediate section 22c that joins the bottom cylindrical section 22a and the top cylindrical section 22b. Thus, the interior chamber 24 diverges through the frustoconical intermediate section 22c.

The divergence of the interior chamber 24 serves to reduce the velocity of the smaller particles and gas flow entering into the top region 26. The reduced velocity, now unable to overcome gravity, dis-entrains the smaller particles, which fall into a collection area that is separate from the fluidized bed in the first sub-region 28a. In this example, the collection area is the second sub-region 28b. For example, no gas flow, or at least a lesser gas flow, is provided to the second gas manifold 36b, such that the second sub-region 28b has a relatively low pressure that facilitates collection of the smaller particles in the second sub-region 28b.

As shown in FIG. 5, once the smaller particles have been collected in the second sub-region 28b, the second metering valve 44b can be opened such that process gas is provided into the second gas manifold 36b. Similar to the process gas provided to the first gas manifold 36a, the process gas permeates through the porous plate 34b and fluidizes the smaller particles in the second sub-region 28b. Here, the flow is controlled such that the smaller particles remain or substantially remain in the second sub-region 28b rather than being ejected up into the top region 26 and, potentially, back over the wall 32.

The metering valve 44a is turned lower to reduce the gas flow into the first gas manifold 36a, but maintain a fluidized bed state. A heater 160 can be provided to heat the vessel 22 and thus also heat the particles in the sub-regions 28a/28b. The heater 160 can be, but is not limited to, a dedicated heater on the vessel 22 or a furnace that the vessel 22 is placed into. The fluidization and heating of the particles serves to degas the powder material. The fluidization mixes the particles and thus facilitates uniform heating that can enhance degassing effectiveness. The flow of process gas around the particles in the respective fluidized beds during degassing also serves to rapidly carry away releases contaminants and thus can also further enhance degassing effectiveness. In this manner, the apparatus 20/120 enables contiguous classification and degassing of the powder material in the single vessel 22.

In further examples, the time at which the heat is applied can be varied. In one example, the vessel 22, and thus the powder, is heated after classification. In another example, the vessel 22 is heated during and after classification.

Once the degassing is completed, the larger particles from the first sub-region 28a can be removed and then subsequently used in a first powder consolidation process, generally represented at 170a, to form a first consolidated article. Similarly, the smaller particles in the second sub-region 28b can be removed and subsequently used in the second powder consolidation process, generally represented at 170b, to form a second consolidated article. In this regard, the initial starting powder material 150 can be classified with respect to preselected powder particle size distributions of each of the powder consolidation processes 170a/170b.

The powder consolidation processes 170a/170b can be additive fabrication processes. Additive fabrication involves building an article layer-by-layer from the powder materials by consolidating selected portions of each successive layer of powder until the complete article is formed. For example, the powder is fed into a processing chamber, which may be under a vacuum or inert cover gas. A machine deposits multiple layers of the powder onto one another. An energy beam, such as a laser, selectively heats and consolidates each layer with reference to a computer-aided design data to form solid structures that relate to a particular cross-section of the article. Other layers or portions of layers corresponding to negative features, such as cavities or openings, are not joined and thus remain as a powdered material. The unjoined powder may later be removed using blown air, for example. The article may then be post-processed to provide desired structural characteristics. For example, the article can be heat treated to produce a desired microstructure. Additive fabrication processes can include, but are not limited to, selective laser melting, direct metal laser sintering, electron beam melting, 3D printing, laser engineered net shaping, or laser powder forming.

In a further example, after classification, and optionally after degassing, the classification is repeated using either the smaller particles or the larger particles as the starting powder material. For example, a starting powder material that has a relatively wide size distribution can be classified into larger particles and smaller particles. The larger particles can then be removed from the vessel 22 and the smaller particles can then be subjected to an additional classification step to divide those particles into a relatively larger set of particles and a relatively smaller set of particles. Similarly, after a first iteration of classification, the larger particles could be further classified. Thus, the apparatus 120 can also be used to reduce powder costs by initially utilizing a powder that has a relatively wide size distribution and then classify the powder into desired size distributions that can be used in various powder consolidation processes.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of treating a powder material, the method comprising:
   providing a vessel that includes an interior chamber, a porous bottom wall, a divider wall that extends from the porous bottom wall and defines first and second sub-regions that are bottom-bound by the porous bottom wall, a top region extending above the divider wall, and first and second gas manifold regions below the porous bottom wall;
   providing a powder material into the first sub-region of the vessel;
   increasing a gas flow from the first gas manifold through the porous bottom wall and into the first sub-region such that the gas flow entrains smaller particles of the powder material and carries the smaller particles upwards from the first sub-region into the top region and over the second sub-region;
   slowing a velocity of the smaller particles in a diffusion zone in the top region such that the smaller particles dis-entrain and fall into the second sub-region thereby classifying the powder material by separating the smaller particles from larger particles of the powder material that do not become entrained and remain in the first sub-region; and degassing the smaller particles and the larger particles within the vessel by heating and fluidizing the smaller particles and the larger particles.

2. The method as recited in claim 1, further comprising heating the powder material within the vessel.

3. The method as recited in claim 1, wherein the divider wall has a top edge and a portion of the interior chamber diverges from a vertical location that is below the top edge to a vertical location that is above the top edge.

4. The method as recited in claim 3, wherein the divider wall is solid with respect to powder movement there through.

5. The method as recited in claim 4, wherein the first and second sub-regions are equal in size.

6. The method as recited in claim 3, wherein the vessel includes a gas outlet at the in a top wall above the top region.

7. The method as recited in claim 6, wherein the vessel includes a cylindrical section, and the portion of the interior chamber that diverges terminates at the cylindrical section.

8. The method as recited in claim 1, further comprising first and second powder consolidation processes that utilize, respectively, the smaller particles and the larger particles, the first consolidation process forming a first consolidated article and the second consolidation process forming a second consolidated article.

9. The method as recited in claim 8, wherein the first and second powder consolidation processes are additive fabrication processes.

* * * * *